United States Patent
Lawson

(10) Patent No.: US 7,890,696 B2
(45) Date of Patent: Feb. 15, 2011

(54) COMMAND QUEUE ORDERING WITH DIRECTIONAL AND FLOATING WRITE BANDS

(75) Inventor: Gabriel J. Lawson, Monument, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 797 days.

(21) Appl. No.: 11/477,980

(22) Filed: Jun. 29, 2006

(65) Prior Publication Data

US 2008/0005458 A1    Jan. 3, 2008

(51) Int. Cl.
G06F 12/00    (2006.01)
G06F 13/00    (2006.01)

(52) U.S. Cl. .............. 711/112; 711/100; 711/118; 711/154

(58) Field of Classification Search .......... 711/112, 711/100, 118, 154, 200
See application file for complete search history.

(56) References Cited

U.S. PATENT DOCUMENTS

| | | | |
|---|---|---|---|
| 5,390,313 A | 2/1995 | Yanai et al. | |
| 5,426,736 A | 6/1995 | Guineau, III | |
| 5,463,758 A | 10/1995 | Ottesen | |
| 5,664,143 A | 9/1997 | Olbrich | |
| 5,787,242 A | 7/1998 | DeKoning et al. | |
| 5,854,941 A | 12/1998 | Ballard et al. | |
| 5,887,128 A * | 3/1999 | Iwasa et al. ................. | 714/6 |
| 6,018,790 A | 1/2000 | Itoh et al. | |
| 6,028,725 A | 2/2000 | Blumenau | |
| 6,061,194 A | 5/2000 | Bailey | |
| 6,070,225 A | 5/2000 | Cheung et al. | |
| 6,076,143 A | 6/2000 | Blumenau | |
| 6,332,177 B1 | 12/2001 | Humlicek | |
| 6,397,292 B1 | 5/2002 | Venkatesh et al. | |
| 6,412,042 B1 | 6/2002 | Paterson et al. | |
| 6,425,052 B1 | 7/2002 | Hashemi | |
| 6,442,648 B1 | 8/2002 | Genduso et al. | |
| 6,457,096 B1 | 9/2002 | Ageishi et al. | |
| 6,490,636 B1 | 12/2002 | Kikuchi et al. | |
| 6,502,178 B1 | 12/2002 | Olbrich | |
| 6,571,298 B1 | 5/2003 | Megiddo | |
| 6,574,676 B1 | 6/2003 | Megiddo | |
| 6,880,102 B1 | 4/2005 | Bridge | |
| 6,978,324 B1 | 12/2005 | Black | |
| 6,978,345 B2 | 12/2005 | Tomaszewski et al. | |
| 2002/0083299 A1 | 6/2002 | Van Huben et al. | |
| 2002/0091882 A1 | 7/2002 | Espeseth et al. | |
| 2002/0103967 A1 * | 8/2002 | Brower et al. ................. | 711/114 |
| 2003/0225969 A1 | 12/2003 | Uchida et al. | |
| 2004/0202073 A1 | 10/2004 | Lai et al. | |
| 2005/0097132 A1 | 5/2005 | Cochran et al. | |

* cited by examiner

Primary Examiner—Tuan V. Thai
(74) Attorney, Agent, or Firm—Fellers, Snider, et al.

(57) ABSTRACT

A data storage system is provided having identical information stored on two different domains, actuators independently moveable in a data transfer relationship with each domain, and a command queue controller configured for short-stroking the actuators in accessing the information from one of the domains. A method is provided for virtualizing a storage space to store user data in a first domain and redundant data in a second domain; pushing access commands from a command queue with a first head adjacent the first domain and a second head adjacent the second domain, the heads being independently moveable in relation to each other; and satisfying a retrieve command from one of the first and second domains, depending on which head is nearest an LBA associated with the retrieve command.

16 Claims, 8 Drawing Sheets

COMMAND QUEUE ORDERING WITH DIRECTIONAL AND FLOATING WRITE BANDS

FIELD OF THE INVENTION

The present invention pertains generally to enhancing throughput performance in a computer system, and more particularly without limitation to an apparatus and associated method for ordering a command queue in a virtualized storage space so that short-stroking can be continuously employed to reduce the average seek distance.

BACKGROUND

Computer systems can comprise input devices, output devices, one or more CPUs and storage devices that can include semiconductor RAM, EEPROM, disc drives, CD drives, other storage media, and intelligent controllers. An operating system can control the configuration of various peripherals, such as display adapters and network interfaces, for example, and provides an application environment and a data system that allocates or de-allocates storage capacity as files are created, modified, or deleted.

Specialized computer systems, such as servers and storage arrays, also employ a system for allocating storage capacity that can be accessed through a network or other connection. Data can be stored across a plurality of disc drives in redundant storage formats such as a redundant array of independent drives (RAID), for example. User data, and any mirror data or parity data ("redundant data"), is mapped to one or more areas on one or more disc drives. Configuration information describing the manner in which data is stored to one or more disc drives is contained in tables or other data structures termed metadata. As files are created, modified, or deleted, the metadata is updated to reflect the allocation or de-allocation of storage capacity.

The performance of the computer system in passing host access commands (both store and retrieve commands) to the storage array can be enhanced by write-caching the access commands and immediately acknowledging them to the host. This permits the actual transfer between the storage array and the cache to take place at an optimal time in relation to holistically viewing system resources against system needs. For example, many times access commands that are pending in the command queue can be performed when the data storage device is otherwise not presently needed by the system.

However, allowing the command queue to grow deep can bog down the system throughput performance, and makes data mismatches more problematic by accumulating an excessive number of acknowledged but not yet satisfied access commands. For this reason it is desirable to pass commands in the command queue as efficiently as possible.

Accordingly, there is a continual need for improvements in the manner in which command queues are managed. It is to these and other improvements that the embodiments of the present invention are generally directed.

SUMMARY OF THE INVENTION

As embodied herein and as claimed below, embodiments of the present invention are generally directed to efficient command queue scheduling to maximize data storage system throughput performance.

In some embodiments a data storage system is provided having identical information stored on two different domains, actuators independently moveable in a data transfer relationship with each domain, and a command queue controller configured for short-stroking the actuators in accessing the information from one of the domains.

In other embodiments a method is provided for: virtualizing a storage space to store user data in a first domain and redundant data in a second domain; pushing access commands from a command queue with a first head adjacent the first domain and a second head adjacent the second domain, the heads being independently moveable in relation to each other; and satisfying a retrieve command from one of the first and second domains, depending on which head is nearest an LBA associated with the retrieve command.

In other embodiments a data storage device is provided having a RAID storage configuration and means for ordering commands in a command queue to continuously short-stroke data storage devices forming the RAID.

These and various other features and advantages which characterize the embodiments of the claimed invention will become apparent upon reading the following detailed description and upon reviewing the associated drawings.

DETAILED DESCRIPTION

Figure 1:
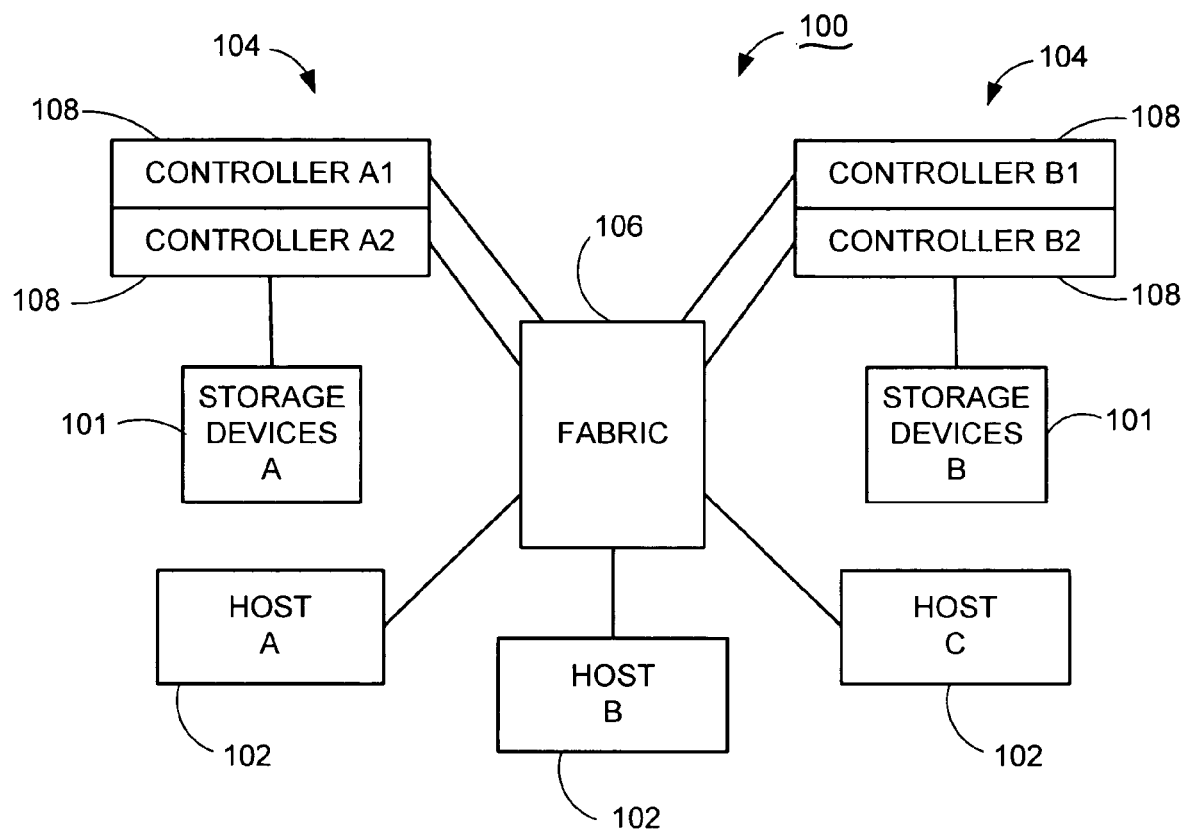
FIG. 1 is a top level functional block depiction of a computer-based system characterized as a wide-area network utilizing mass storage.

Embodiments of the present invention can be employed in various environments such as computers or servers with internal or attached data storage devices, or in an intelligent storage system. Intelligent storage systems have intelligent controllers and interfaces that can have one or more data storage arrays. To illustrate an exemplary environment in which presently preferred embodiments can be advantageously practiced, FIG. 1 shows a computer-based system 100 characterized as a wide area network (WAN) utilizing mass storage.

The system 100 includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well, including the Internet.

Each array 104 includes a pair of controllers 108 (denoted A1, A2 and B1, B2) and a set of data storage devices (characterized below as a "multiple drive array" or "MDA") 101 presently characterized as having disc drives, without limitation, and operated as a RAID. The controllers 108 and set of data storage devices 101 preferably utilize a fault tolerant arrangement so that the various controllers 108 utilize parallel, redundant links and at least some of the user data stored by the system 100 is stored in a redundant format within at least one set of data storage devices 101.

It is further contemplated that the A host computer 102 and the A data storage array 104 can be physically located at a first site, the B host computer 102 and B storage array 104 can be physically located at a second site (remotely to A and C), and the C host computer 102 can be yet at a third site (remotely to A and B), although such is merely illustrative and not limiting.

Figure 2:
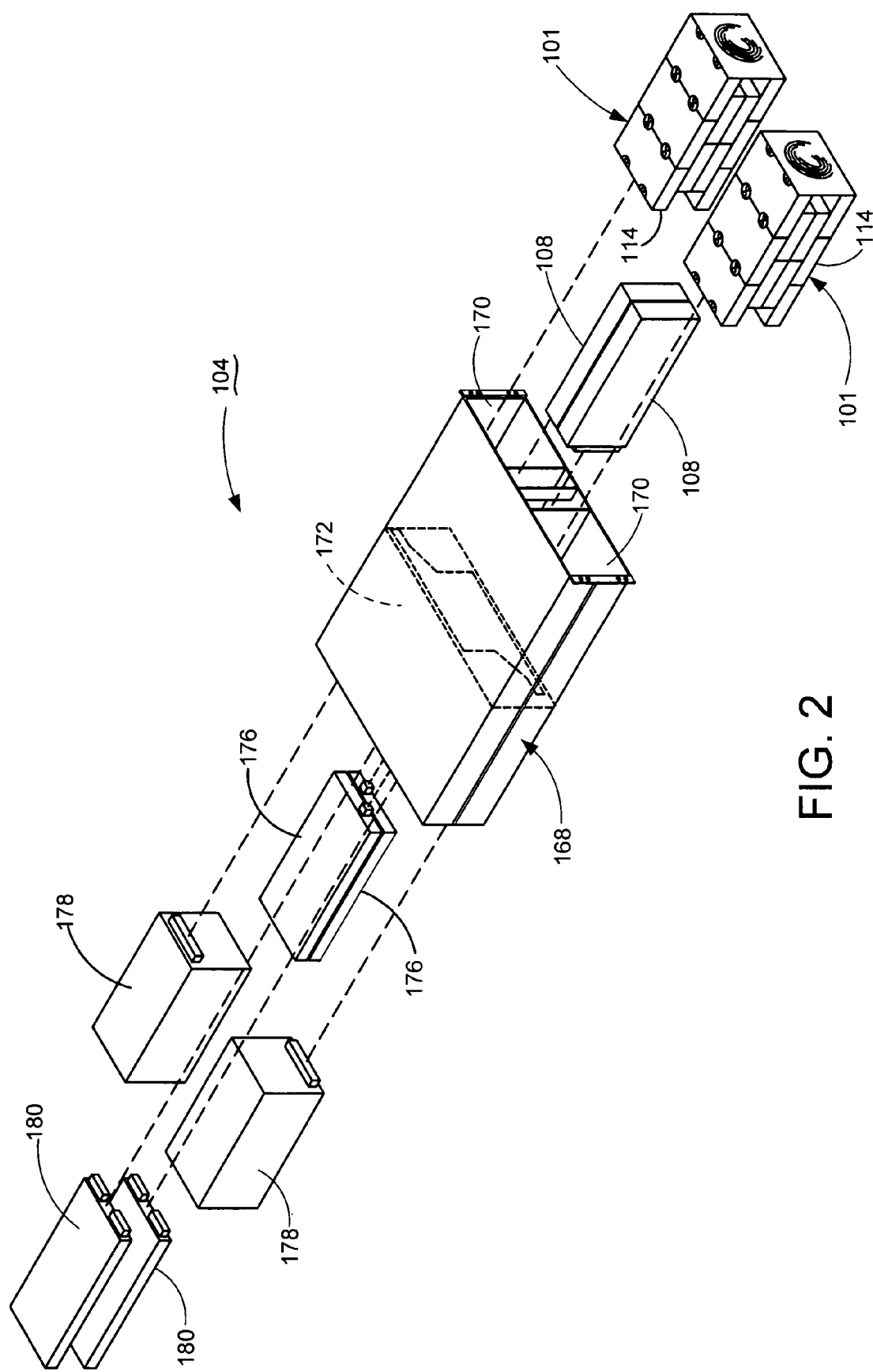
FIG. 2 is an exploded isometric view of a pertinent portion of a computer-based system constructed in accordance with FIG. 1.

FIG. 2 illustrates an array 104 that is constructed in accordance with embodiments of the present invention. Two MDAs 101 are utilized, each with a capacity of ten data storage devices 114. The MDA 101 advantageously provides a convertible plurality of the data storage devices 114 for mass storage. By "convertible" it is meant that one or more of the data storage devices 114 can be readily replaced, added, or removed in an existing MDA 101, or that a different MDA can be utilized that is capable of supporting a different number, size or arrangement of data storage devices 114. By "componentized" it is meant that the data storage devices 114 and associated control electronics in the MDA 101 are collectively integrated so as to be functionally presentable by the array 104 as a seamless block of storage capacity.

Figure 3:
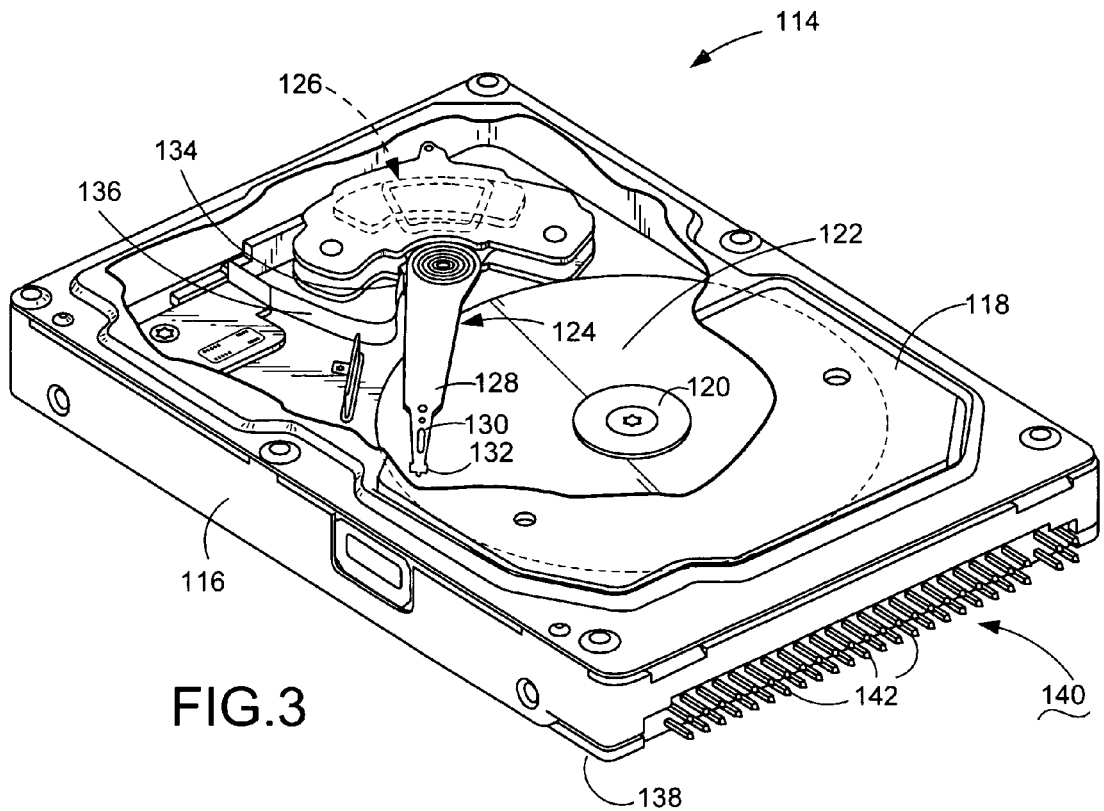
FIG. 3 is an isometric view of a data storage device that can be used in practicing the embodiments of the present invention.

FIG. 3 shows an isometric view of one of the data storage devices 114 with which embodiments of the present invention can be advantageously practiced. It will be understood, however, that the embodiments of the present invention are not so limited.

The device 114 preferably includes a base 116 and a cover 118 (partially cutaway), which together provide a housing for a number of components. The components include a motor 120 to which is fixed one or more storage mediums 122 in rotation therewith. Adjacent the storage medium 122 is an actuator assembly 124 that pivots around a bearing assembly through application of current to a voice coil motor (VCM) 126. In this way, controlled operation of the VCM 126 causes the actuator 124 to move radially across the storage medium 122.

The actuator assembly 124 includes an actuator arm 128 supporting a load arm 130 that, in turn, supports a head 132 (or "transducer") at a distal end thereof in a data transfer relationship with the adjacent storage medium 122. Each storage medium 122 can be divided into data tracks, and the head 132 is positionable to retrieve data from and store data to the tracks.

To provide the requisite electrical conduction paths between the head 132 and device 114 control circuitry, the head 132 advantageously has a flex circuit that is routed on the actuator assembly 124 from the head 132, along the load arm assembly 130 and the actuator arm 128, and to a circuit portion 134 that is supported by a proximal end (sometimes referred to as "E block") of the actuator assembly 124. The circuit portion 134 connects the head 132 flex circuit to another flex circuit 136 which passes through the base 116 to a printed circuit board (PCB) 138. An electrical connector 140 attached to the PCB 138 has a plurality of contacts 142 for connecting the device 114 to a mating connector (not shown), such as for placing the device 114 in communication with external control circuitry.

Figure 4:
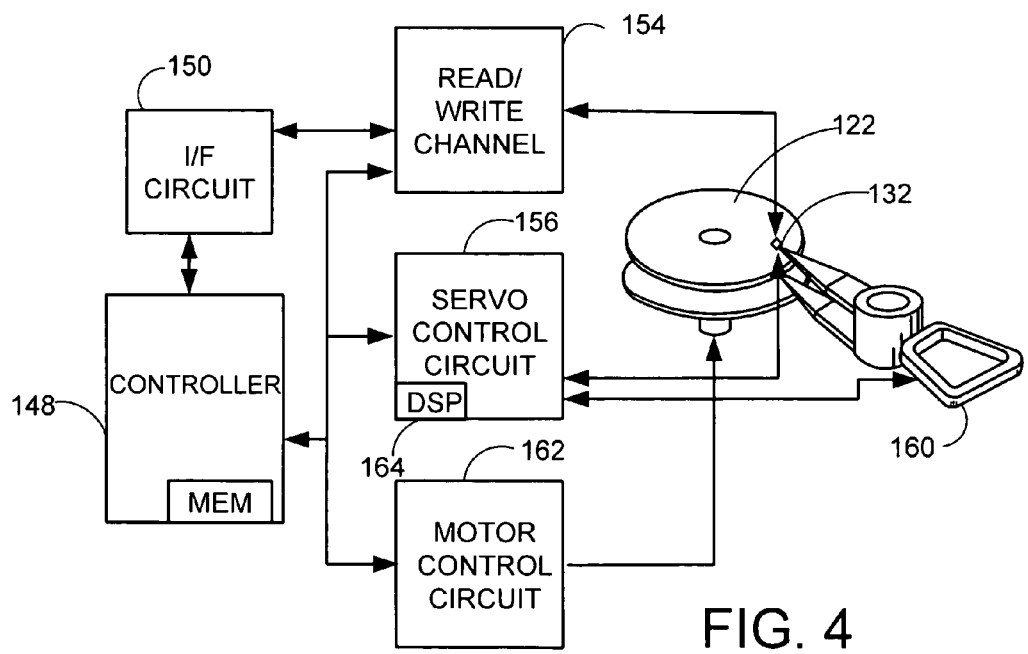
FIG. 4 is a functional block depiction of the data storage device of FIG. 3.

FIG. 4 provides a functional block diagram of the device 114 of FIG. 3. A programmable controller 148 provides top-level communications and control for the device 114. An interface (I/F) 150 facilitates input and output (I/O) communications and transfers to an external device with which the device 114 can be associated. A read/write (R/W) channel 154 conditions data to be written to the storage medium 122 during a data store operation, and reconstructs data retrieved from the storage medium 122 for transfer to the external device during a data retrieve operation.

A servo circuit 156 provides closed-loop positional control for the heads 132, such as by using servo data stored to the storage medium 122. The servo circuit 156 is preferably configured to carry out a number of control functions including track following operations whereby a selected head 132 follows a corresponding track on the storage medium 122, seek operations whereby a selected head 132 is moved from an initial track to a destination track, and head 132 load/unload operations whereby the heads 132 are moved away from or to a parking zone or structure.

The servo circuit 156 applies the requisite currents to a coil 160 of the VCM 126 to selectively move the heads 132 in relation to the tracks of the storage medium 122. The servo circuit 156 further preferably includes a spindle motor driver circuit 162 to control the spindle motor 120. Processing requirements to carry out these and other servo functions are preferably supplied by a digital signal processor (DSP) 164 or other processing device of the servo circuit 156, such as an ARM. The servo processing can alternatively be supplied by the top level controller 148 in a single processor environment.

Returning now to FIG. 2, a shelf 168 defines cavities 170 into each of which an MDA 101 is receivingly engageable for communication with a backplane 172. Similarly, the shelf 168 defines cavities for receivingly engaging other electrical modules with the backplane 172, such as, but not limited to, storage controllers 108, batteries 176, power supplies 178, and interfaces 180.

Figure 5:
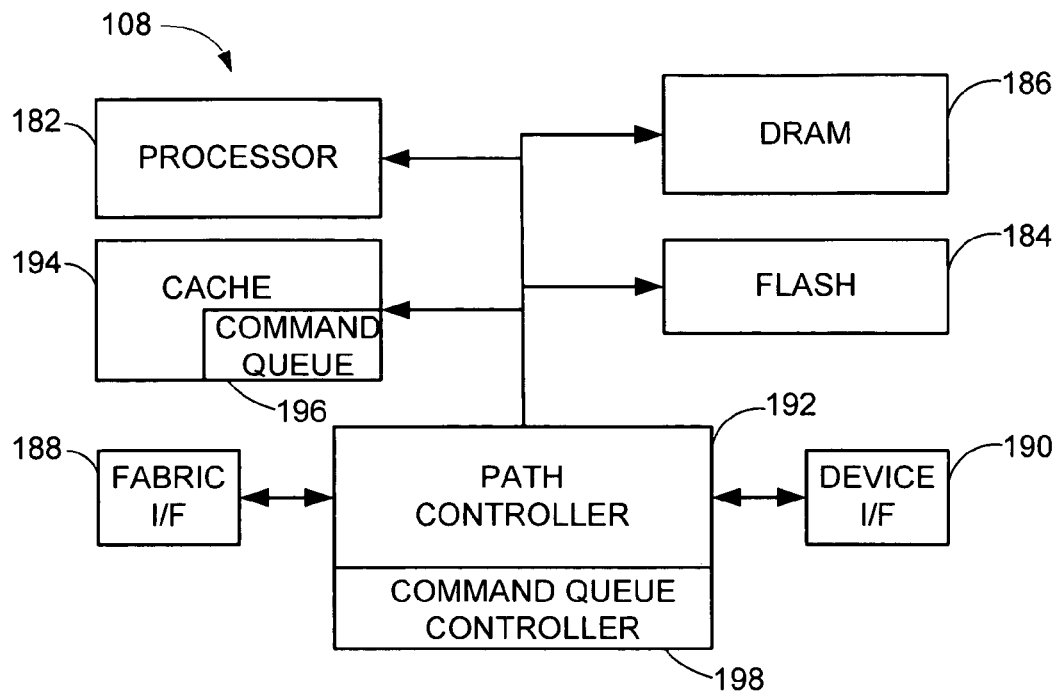
FIG. 5 provides a functional block diagram illustrating a selected one of the controllers of FIG. 1.

FIG. 5 illustrates a selected one of the controllers 108 in greater detail. The controller 108 can be embodied in a single integrated circuit, or distributed among a number of discrete circuits as desired. A main processor 182, preferably characterized as a programmable, computer processor, provides control in accordance with programming steps and processing data preferably stored in non-volatile memory 184 (such as flash memory or similar) and in dynamic random access memory (DRAM) 186.

A fabric interface (I/F) circuit 188 communicates with the other controllers 108 and the host computers 102 via the fabric 106, and a device I/F circuit 190 communicates with the storage devices 114. The I/F circuits 188, 190 and a path controller 192 form a communication path to pass commands and data between the storage array 104 and the host 102, such as by employing the cache memory 194. Although illustrated discretely, it will be understood that the path controller 192 and the I/F circuits 188, 190 can be unitarily constructed.

Preferably, in order to increase host processing performance, write commands are write-back cached in the cache memory 194 and held as pending therein within a command queue 196. A command queue controller 198 portion of the path controller 192 orders the passing of the write commands, as well as higher priority read commands, according to the embodiments of the present invention.

The data storage capacity of an array 104, defined by the combined capacities of the data storage devices 114, is organized into logical devices that can be written to and read from the array 104. System configuration information defines the relationship between user data, as well as any associated parity and mirror data ("redundant data"), with the respective storage locations. The system configuration information furthermore identifies the relationship between blocks of storage capacity allocated to data and the memory storage locations, such as logical block addresses (LBA). The system configuration information can furthermore include virtualization by defining virtual block addresses that are mapped to logical block addresses.

Embodiments of the present invention employ a data storage grid architecture mapped across a plurality of the data storage devices 114. A data grid comprises a plurality of consecutive data blocks in a plurality of storage domains. A first data block of each plurality of data blocks for each of the storage domains is typically at the same address (called a grid base address), simplifying address generation; however, differing base addresses for two or more storage domains can be employed. The grid provides a predefined amount of data storage space. The amount of data storage space in a grid can be allocated to one logical unit, and grids can be virtually mapped in simplifying metadata overhead.

Figure 6:
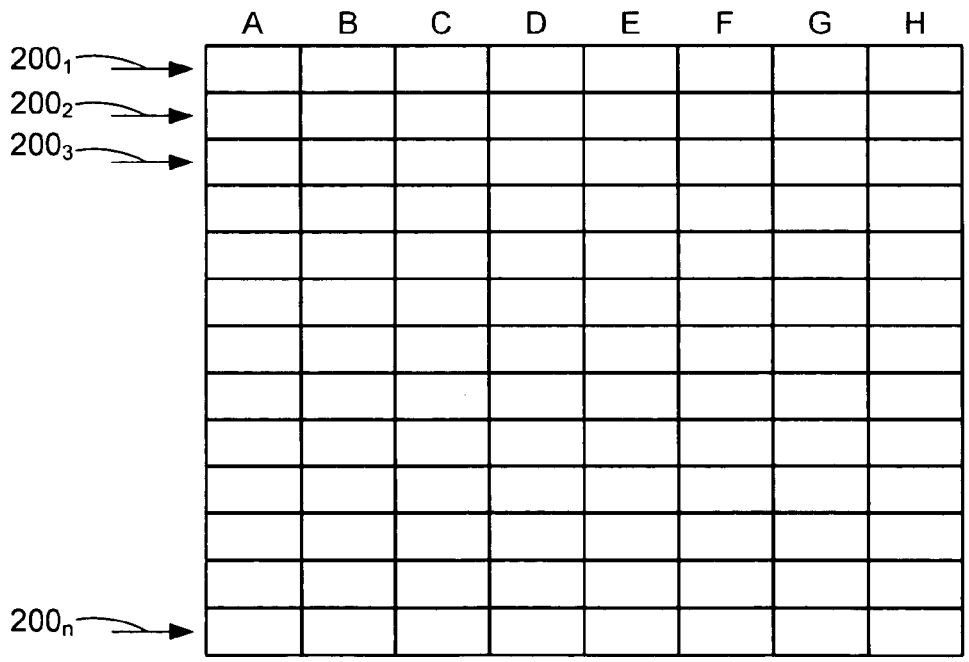
FIG. 6 is a diagrammatic illustration of a data storage grid employing a RAID 1 storage system in accordance with illustrative embodiments of the present invention.

FIG. 6 depicts a data storage grid that can be viewed as a two dimensional array of equal-sized data blocks. Columns in the array correspond to data storage devices 114 and rows correspond to data blocks starting at the same LBA in each data storage device 114. Accordingly, the data storage grid in FIG. 6 has a plurality of rows 200 that intersect the data storage devices 114 (domains) designated A, B, C, D, E, F, G, and H to define the array of data blocks.

Data blocks in a grid are of equal size (storage capacity) but are not limited to a particular size. The size of a data block can be specified when configuring a storage system and can reflect the size (storage capacity) of data storage devices in the system, user applications, controller hardware and software, and other factors. Rows 200 are contiguous in that there is no undefined storage space between adjacent rows of the grid. The starting address of the first row in the grid serves as the base address for the grid, and grids can be defined such that the base address is aligned to an address that is a multiple of the size of a data storage block multiplied by the number of rows in a grid.

Grids can be numbered, and the storage capacity contained in a grid can be allocated using a pointer to the grid. A pointer table can associate a pointer with a grid number, providing easy virtualization and reducing metadata overhead. Pluralities of grids can be defined that occupy a portion of the available storage capacity of the data storage devices in the array. Drives or data blocks of grids can be designated as spare(s), providing additional storage capacity that can be employed to contain reconstructed or copied data in the event of failure of other data storage devices in the system. Data blocks in a grid can also be dedicated for use in storing only primary user data or in storing only redundant data for error recovery.

For illustrative purposes the storage grid in FIG. 6 can be divided to allocate the first four domains A, B, C, D for storing primary (user) data and the last four domains E, F, G, H for mirroring the primary data in a RAID 1 configuration. For the sake of simplicity, the virtualized storage space is mapped to the storage grid beginning at the same LBA in each of the domains. Furthermore, data stored in primary domain A is mirrored in redundant domain E, and so forth.

FIGS. 7-12 depict a simplified diagrammatic portion of the grid of FIG. 6, showing only primary storage domain A and its redundant storage domain E. All these FIGS. depict bands of LBAs 202, 204 within which the actuators 124 are moveable so that the command queue controller 198 can push store commands from the command queue 196. The size of the bands can be as desired from one to a plurality of tracks, the specification of which is not necessary to the skilled artisan for an understanding of the embodiments of the present invention.

What is advantageous, however, is the fact that because identical information is stored on both domains, and because the actuators being in different domains are independently moveable in a data transfer relationship with the respective storage medium 122, the command queue controller 198 can effectively short-stroke one of the actuators 124 in satisfying a retrieve command. That is, the command queue controller 198 can push a retrieve command immediately upon its receipt to one of the actuators 124 having a comparatively shorter seek distance to an LBA associated with the retrieve command.

Preferably, the command queue controller 198 pushes primary data store commands to the domain A while controlling the actuator 124 to move the band 202 across the full complement of LBAs in accordance with a directional pushing algorithm. In some embodiments, for example, the band 202 moves according to the SCAN directional algorithm, or alternatively it can move according to the CSCAN directional algorithm. In any event, preferably the command queue controller 198 can also push redundant data store commands from the command queue 196 to the domain E while controlling the actuator 124 to move the band 204 coincidentally with the band 202. That is, the term "coincidentally" for purposes of this description and the appended claims means that as the band 202 is moved incrementally across the storage medium 122, the band 204 is likewise moved to maintain a substantially fixed LBA separation between the bands 202, 204 during the time which store commands are being pushed to the domains. Sometimes this positional relationship is referred to as a directional primary head (position is determined by the directional algorithm) and a floating redundant head (position floats in relation to the directional head). It will be noted that it is the bands 202, 204 that are moved coincidentally, not the actuators 124. The actuators 124 remain independently moveable so that the LBA separation between them is always somewhat variable, within the extent of travel defined by the width of the bands 202, 204 while pushing store commands. Accordingly, the term "substantially fixed coincidental separation" means the LBA spacing between the bands 202, 204, with the actuators confined to movement within the respective bands 202, 204 during times when the command queue controller 198 is pushing only store commands from the command queue 196.

Figure 7:
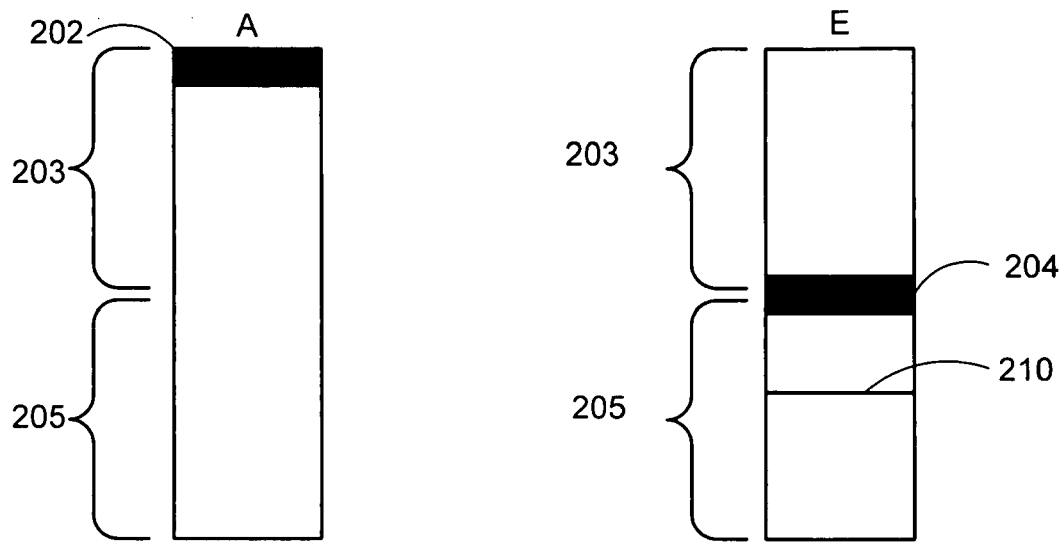
FIGS. 7-12 diagrammatically depict a portion of the data storage grid of FIG. 6 showing an illustrative directional pushing algorithm and floating algorithm in which the heads pass store commands from the command queue to the domains.
Figure 8:
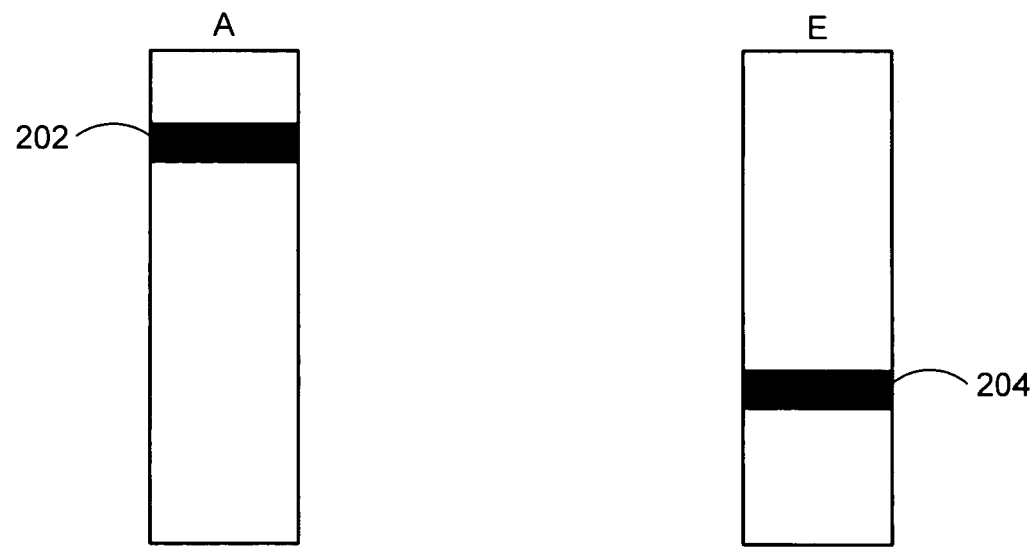
Figure 9:
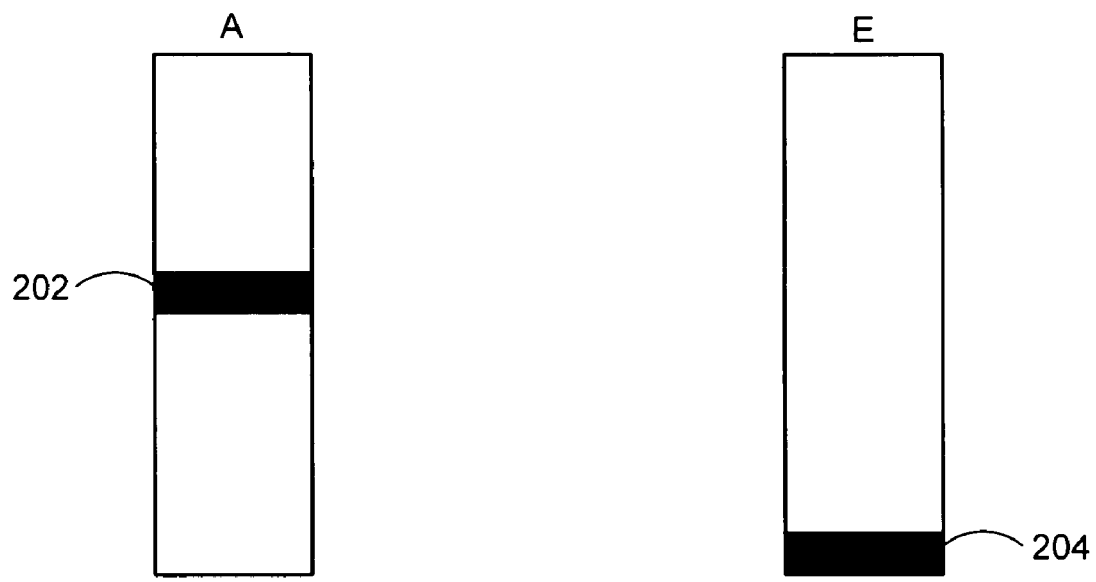
Figure 10:
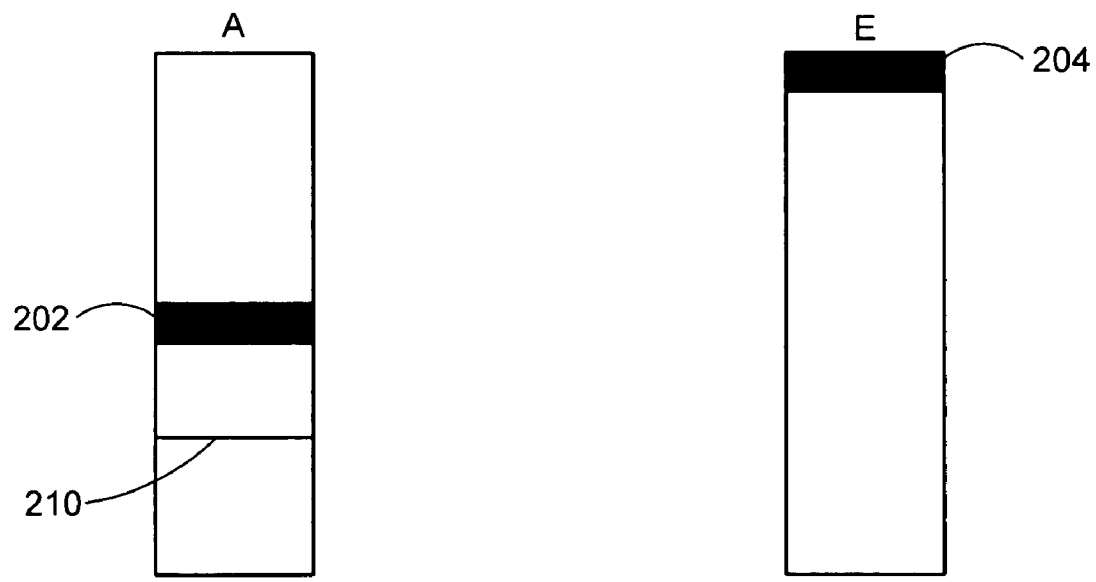
Figure 11:
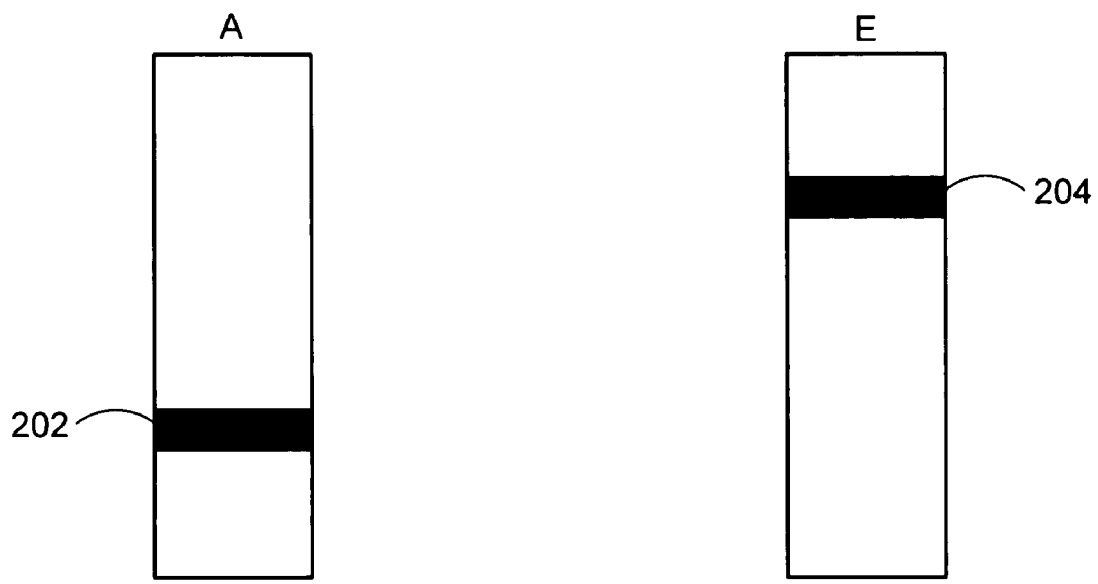
Figure 12:
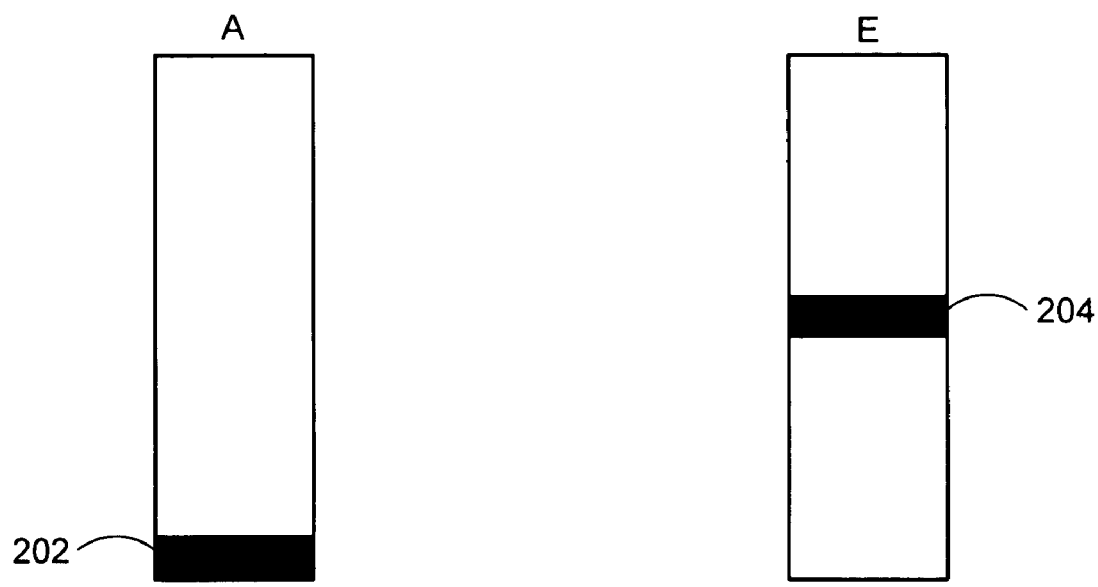

In the illustrative embodiments of FIGS. 7-12 the fixed LBA separation between the bands 202, 204 is substantially half of a full complement of the LBAs on each domain. This arrangement effectively optimizes short-stroking one of the actuators because the maximum seek distance will be half the radial distance of the data storage medium 122. In maintaining such a "half-disc separation" between the bands 202, 204, it will be noted that FIGS. 7-9 show that the band 204 leads the band 202 as the band 202 is moved inwardly in an outer half 203 of the disc. As shown in FIGS. 10-12, when the band 202 reaches the middle of the disc, then the band 204 moves to the outer diameter of the disc and thereafter lags the band 202 as it continues to move inwardly in an inner half 205 of the disc.

However, the command queue controller 198 can immediately push a higher-priority retrieve command to either of the domains by non-coincidentally moving the selected actuator 124 to satisfy the retrieve command. For purposes of this description and the appended claims, the term "non-coincidentally" means that the selected actuator 124 can move to a track either within or outside the respective band 202, 204 in satisfying the retrieve command. In other words, the selected actuator 124 in satisfying retrieve commands is moveable without regard to the respective band 202, 204. This is illustrated by comparing FIGS. 7 and 10, wherein the actuator 124 in domain E is moved non-coincidentally to satisfy a retrieve access command associated with LBA 210 in FIG. 7. However, the actuator 124 of domain A will be selected in FIG. 10 to satisfy the same retrieve command.

Figure 13:
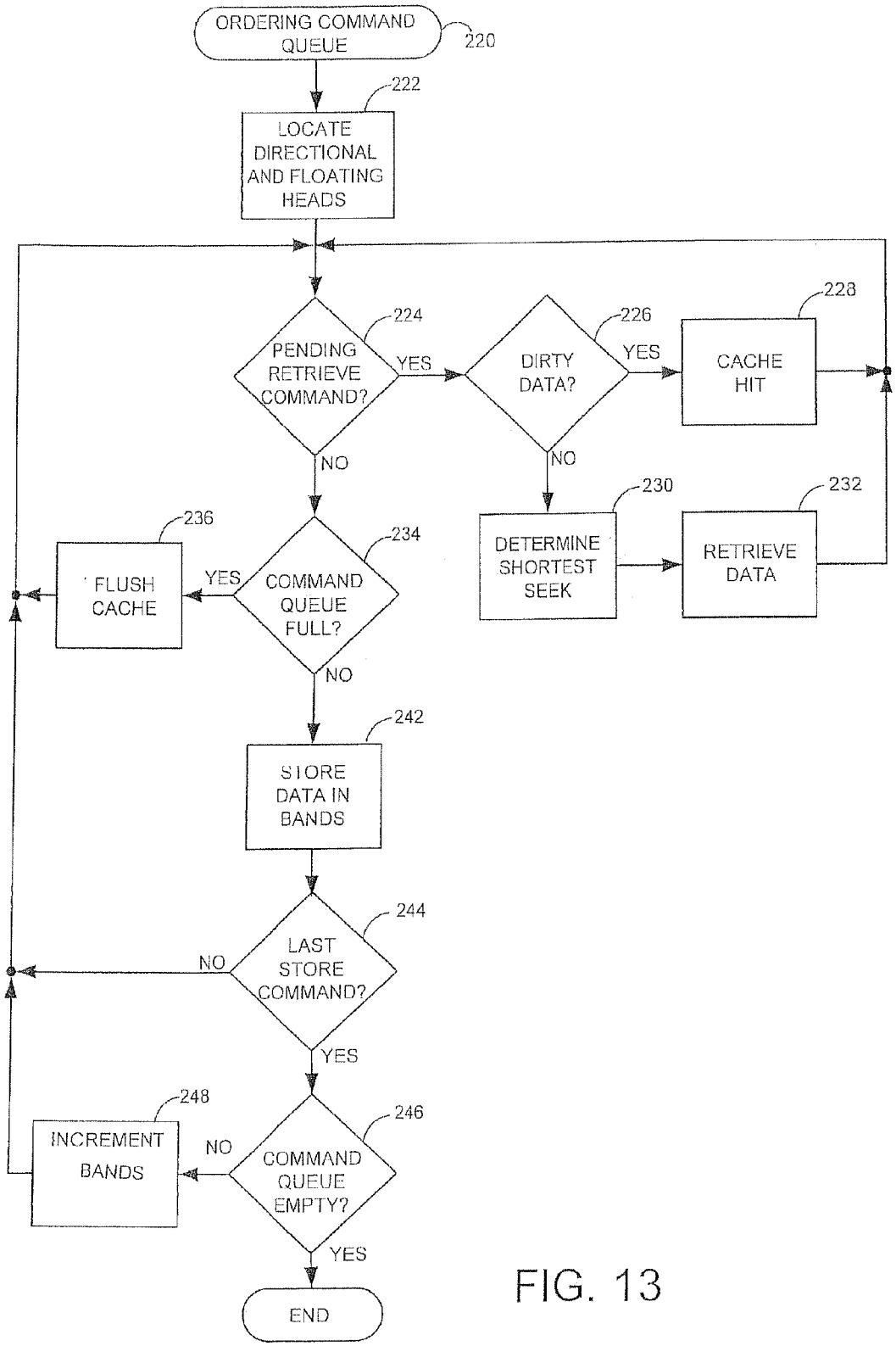
FIG. 13 is a flowchart illustrating steps for practicing a method of ORDERING A COMMAND QUEUE in accordance with embodiments of the present invention.

FIG. 13 is a flowchart depicting steps for practicing a method of ORDERING A COMMAND QUEUE in accordance with embodiments of the present invention. The method 220 begins at step 222 where the path controller 192 initially positions the primary data directional head 132 and the redundant data floating head 132, thereby defining the coincidental separation between the bands 202, 204 in which the heads 132 are confined while satisfying store commands.

In block 224 it is determined whether there are currently any high priority retrieve commands pending in the command queue 196. If the determination of block 224 is yes, then in block 226 the command queue controller 198 determines whether the requested data is dirty. If the determination of block 226 is yes, then a cache hit is made in block 228 to satisfy the retrieve command, and then control returns to block 224. If the determination of block 226 is no, then in block 230 the path controller 192 determines which domain has the actuator 124 with the shortest seek distance to the LBA associated with the pending retrieve command. In block 232 the path controller 192 retrieves the data from the selected actuator 124 and control returns to block 224.

If the determination of block 224 is no, then in block 234 the path controller 192 determines whether the command queue 196 is full (deeper than a predetermined threshold). If the determination of block 234 is yes, then in block 236 the path controller 192 flushes the command queue 196 to a predetermined queue depth. If the determination of block 234 is no, then control passes to block 242 where the path controller 192 identifies and passes a pending store command in the command queue 196 associated with an LBA contained in a respective band 202, 204 of one of the domains. In block 244 it is determined whether the last pending store command has been pushed from the command queue 196 for the respective bands 202, 204. If the determination of block 244 is no, then control returns to block 224; otherwise control passes to block 246. In block 246 it is determined whether the command queue 196 is empty. If yes, the method ends; otherwise, the directional head 132 is incremented according to the directional pushing algorithm in block 248 and control returns to block 224.

In the embodiments discussed above the command queue controller 198 is contained within the controller 108 in the MDA 101. This description is only illustrative and not limiting to the scope of the present embodiments, which also contemplates placing some or all of the functionality of the command queue controller within the host 102 or some other external device therebetween the host and the MDA 101, or within the data storage device 114.

Summarizing generally, preferred embodiments of the present invention are characterized as a data storage system having a RAID storage configuration and means for ordering commands in a command queue to short-stroke data storage devices forming the RAID. The skilled artisan will understand from this description that the meaning of the term "means for ordering commands," for purposes of this description and the appended claims, requires the directional and floating bands in the plurality of domains forming the RAID, with the actuators being confined to seek coincidentally within the respective bands while passing store commands but able to seek non-coincidentally to short-stroke an actuator in satisfying retrieve commands.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. A data storage system comprising a primary data domain that stores primary data and a separate redundant data domain that stores redundant data, actuators independently moveable in a data transfer relationship with each domain, and a command queue controller that operably satisfies a retrieve command by short-stroking via the actuator that is comparatively closer to data associated with the retrieve command.

2. The data storage system of claim 1 wherein the command queue controller satisfies the retrieve command via the actuator having a comparatively shorter seek distance to an LBA associated with the retrieve command.

3. The storage system of claim 2 wherein a virtual storage space is mapped to both domains beginning at the same LBA in each domain.

4. The storage system of claim 2 wherein the command queue controller orders store commands limited to storage locations within predefined bands of storage space in each domain.

5. The storage system of claim 4 wherein the command queue controller moves the predefined band of storage space in the primary storage domain in relation to store command activity, and moves the predefined band of storage space in the redundant data domain in relation to the movement of the predefined band of storage space in the primary storage domain.

6. The storage system of claim 5 wherein the command queue controller maintains a predefined separation between the bands of storage space.

7. The storage system of claim 6 wherein the domains comprise rotating discs, and wherein the actuator adjacent the redundant storage medium leads the actuator adjacent the primary storage medium as the actuator adjacent the primary storage medium moves inwardly adjacent an outer half of the disc.

8. The storage system of claim 7 wherein the actuator adjacent the redundant storage medium lags the actuator adjacent the primary storage medium as the actuator adjacent the primary storage medium moves inwardly adjacent an inner half of the disc.

9. The storage system of claim 5 wherein the command queue controller prioritizes the retrieve command with respect to the store command.

10. A method comprising:
   virtualizing a storage space to store user data in a primary domain and to store mirror data in a redundant domain;
   pushing access commands with a first transfer member adjacent the primary domain and a second transfer member adjacent the redundant domain, the transfer members being independently moveable in relation to each other; and
   satisfying a retrieve command from one of the primary and redundant domains, depending on which respective transfer member is nearest an LBA associated with the retrieve command.

11. The method of claim 10 wherein the virtualizing step is characterized by mapping the storage space to both domains beginning at the same LBA in each domain.

12. The method of claim 11 wherein the pushing access commands step is characterized by prioritizing retrieve commands over store commands.

13. The method of claim 12 wherein the pushing access commands step is characterized by ordering store commands only with respect to storage locations within predefined bands of storage space in each domain.

14. The method of claim 13 wherein the pushing access commands is characterized by moving the redefined band of storage space in the primary storage domain in relation to store command activity, and moving the predefined band of storage space in the redundant data domain in relation to the movement of the predefined band of storage space in the primary storage domain.

15. The method of claim 14 wherein the pushing access commands is characterized by maintaining a predefined separation between the bands of storage space.

16. The storage system of claim 15 wherein the domains comprise rotating discs, and wherein the second transfer member leads the first transfer member as the first transfer member moves inwardly adjacent an outer half of the disc, and wherein the second transfer member lags the first transfer member as the first transfer member moves inwardly adjacent an inner half of the disc.

* * * * *